(12) United States Patent
Mahmood

(10) Patent No.: US 11,134,408 B2
(45) Date of Patent: *Sep. 28, 2021

(54) ESTABLISHING A VOICE CALL

(71) Applicant: BlackBerry Limited, Waterloo (CA)

(72) Inventor: Hamid Mahmood, Kanata (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/448,146

(22) Filed: Jun. 21, 2019

(65) Prior Publication Data

US 2019/0313274 A1 Oct. 10, 2019

Related U.S. Application Data

(63) Continuation of application No. 15/874,424, filed on Jan. 18, 2018, now Pat. No. 10,334,470, which is a
(Continued)

(51) Int. Cl.
*H04W 28/02* (2009.01)
*H04M 3/42* (2006.01)
(Continued)

(52) U.S. Cl.
CPC ......... *H04W 28/0247* (2013.01); *H04L 45/22* (2013.01); *H04M 3/02* (2013.01);
(Continued)

(58) Field of Classification Search
CPC ............... H04W 28/027; H04W 76/10; H04W 36/0022; H04W 88/06; H04W 28/0247; H04W 76/50; H04W 48/18; H04L 45/22; H04M 3/02; H04M 3/42246; H04M 2207/18
(Continued)

(56) References Cited

U.S. PATENT DOCUMENTS 8,259,673 B2 9/2012 Diachina et al.
2003/0081754 A1 5/2003 Esparza
(Continued)

FOREIGN PATENT DOCUMENTS

CN 102238085 A 11/2011
CN 102291807 A 12/2011
(Continued)

OTHER PUBLICATIONS

Canadian Intellectual Property Office, International Search Report and Written Opinion for PCT/CA2016/051155 dated Dec. 8, 2016 (14 pages).
(Continued)

*Primary Examiner* — Farid Seyedvosoghi
(74) *Attorney, Agent, or Firm* — Trop Pruner & Hu, P.C.

(57) ABSTRACT

A user equipment (UE), which is able to use a plurality of different wireless access technologies, receives a request to establish a voice call. The UE determines whether voice over a first wireless access technology of the different wireless access technologies is supported, and responsive to determining that voice over the first wireless access technology is not supported, the UE attempts to establish the voice call over a second wireless access technology of the different wireless access technologies.

17 Claims, 3 Drawing Sheets

Related U.S. Application Data continuation of application No. 14/874,938, filed on Oct. 5, 2015, now Pat. No. 9,877,224.

(51) Int. Cl.
  *H04W 48/18* (2009.01)
  *H04L 12/707* (2013.01)
  *H04W 76/10* (2018.01)
  *H04M 3/02* (2006.01)
  *H04W 36/00* (2009.01)
  *H04W 88/06* (2009.01)

(52) U.S. Cl.
  CPC ....... *H04M 3/42246* (2013.01); *H04W 48/18* (2013.01); *H04W 76/10* (2018.02); *H04M 2207/18* (2013.01); *H04W 36/0022* (2013.01); *H04W 88/06* (2013.01)

(58) Field of Classification Search
  USPC ........................................................ 455/445
  See application file for complete search history.

(56) References Cited

U.S. PATENT DOCUMENTS

| | | | |
|---|---|---|---|
| 2006/0063560 A1 | 3/2006 | Herle | |
| 2006/0189331 A1 | 8/2006 | Lundsjo | |
| 2010/0098023 A1 | 4/2010 | Aghili | |
| 2010/0142488 A1 | 6/2010 | Zhang | |
| 2010/0279648 A1 | 11/2010 | Song | |
| 2010/0329243 A1* | 12/2010 | Buckley | H04L 65/1069 370/352 |
| 2011/0149750 A1 | 6/2011 | Sharma | |
| 2012/0195261 A1 | 8/2012 | Nishida et al. | |
| 2012/0224563 A1* | 9/2012 | Zisimopoulos | H04W 36/14 370/331 |
| 2012/0282965 A1* | 11/2012 | Kim | H04W 4/70 455/515 |
| 2013/0010656 A1 | 1/2013 | Chin et al. | |
| 2013/0120519 A1 | 5/2013 | Jin | |
| 2014/0128017 A1 | 5/2014 | Han et al. | |
| 2014/0226568 A1 | 8/2014 | Jeong et al. | |
| 2014/0370886 A1 | 12/2014 | Lisak | |
| 2015/0063227 A1* | 3/2015 | Chaponniere | H04M 7/0057 370/329 |
| 2015/0350927 A1* | 12/2015 | Dahiya | H04W 56/00 370/312 |
| 2016/0037390 A1* | 2/2016 | Mufti | H04L 65/1006 455/404.1 |
| 2016/0044178 A1 | 2/2016 | Narayanaswamy | |
| 2016/0066220 A1 | 3/2016 | Bae | |
| 2016/0100338 A1 | 4/2016 | Wu | |
| 2016/0219648 A1 | 7/2016 | Awoniyi-Oteri | |
| 2016/0353449 A1* | 12/2016 | Chuttani | H04W 72/0493 |

FOREIGN PATENT DOCUMENTS

| | | |
|---|---|---|
| CN | 102484849 A | 5/2012 |
| CN | 102511185 A | 6/2012 |
| KR | 20140057010 A | 5/2014 |
| KR | 20150053681 A | 5/2015 |
| WO | 2015/016610 A1 | 2/2015 |

OTHER PUBLICATIONS

European Patent Office, Extended European Search Report for Appl. No. 16852935.2 dated Apr. 10, 2019 (9 pages).

European Patent Office, Communication pursuant to Article 94(3) EPC for Appl. No. 16852935.2 dated Apr. 20, 2020 (5 pages).

European Patent Office, Extended European Search Report for Appl. No. 20207322.7 dated Jan. 29, 2021 (9 pages).

* cited by examiner

ESTABLISHING A VOICE CALL

CROSS REFERENCE TO RELATED APPLICATION

This is a continuation of U.S. application Ser. No. 15/874,424, filed Jan. 18, 2018, which is a continuation of U.S. application Ser. No. 14/874,938, filed Oct. 5, 2015, which are both hereby incorporated by reference in their entirety.

BACKGROUND

Mobile communications networks allow user equipments (UEs) to establish wireless communications with other endpoints. A mobile communication network can include wireless access network nodes that provide respective coverage areas (also referred to as "cells"). A UE that is within a particular coverage area is able to establish a connection with the corresponding wireless access network node.

BRIEF DESCRIPTION OF THE DRAWINGS

Some implementations are described with respect to the following figures.

DETAILED DESCRIPTION

Figure 1:
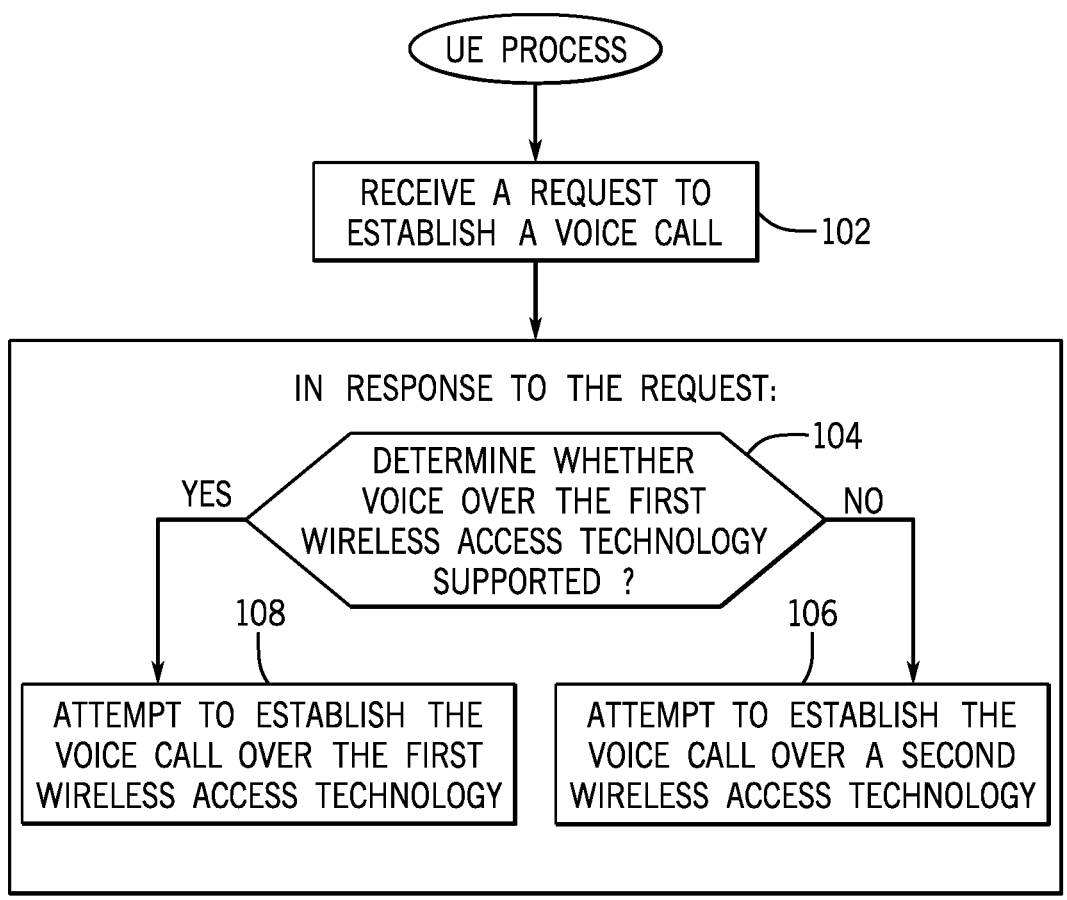
FIG. 1 is a flow diagram of an example process performed by a user equipment (UE), according to some implementations.

Different wireless access technologies can be employed by mobile communications networks. With certain wireless access technologies, voice calls are performed in a circuit-switched (CS) domain. A "voice call" can refer to a communications session in which at least one user speaks to another party, which can be another user or a machine (e.g. voice answering systems). Performing communications in the CS domain can involve establishing circuits (also referred to as dedicated channels) in the mobile communications network for the duration of a communication between endpoints.

An example of a wireless access technology that performs voice calls in the CS domain is the Global System for Mobile Communications (GSM) wireless access technology. Some GSM networks provide Enhanced Data Rates for GSM Evolution (EDGE) to support packet-switched (PS) communications of data. PS communications refer to communications in which data (e.g. emails, web browsing traffic, document transfer traffic, etc.) to be transmitted is divided into packets that can be individually routed through a communications network. A packet can include a header and payload, where the payload contains the actual data to be communicated, and the header includes information that is used by communication devices in the network to direct each packet to a target destination.

Although a GSM/EDGE network can support communication of data in the PS domain, voice communications are still communicated by the GSM/EDGE network in the CS domain.

Another example of a wireless access technology that performs voice communications in the CS domain is the Wideband Code Division Multiple Access (WDCMA) access technology.

Although reference is made to various example wireless access technologies that perform voice communications in the CS domain, it is noted that in other examples, other wireless access technologies also perform voice calls in the CS domain. Such wireless access technologies are referred to as "legacy" wireless access technologies in the ensuing discussion.

A more advanced type of wireless access technology is provided by the Long-Term Evolution (LTE) standards, which are implemented by the Third Generation Partnership Project (3GPP). The LTE standards are also referred to as the Evolved Universal Terrestrial Radio Access (E-UTRA) standards. The LTE wireless access technology is a fourth generation (4G) wireless access technology that is capable of supporting voice calls in the PS domain (referred to as voice-over-LTE or VoLTE). However, even though LTE is capable of supporting VoLTE, the configuration of a UE and/or of wireless access network nodes in an LTE network may specify that the VoLTE is not supported. The UE and wireless access network can communicate this VoLTE capability during initial access of the UE.

Although reference is made to LTE in the ensuing discussion, it is noted that techniques or mechanisms according to some implementations can be applied to other wireless access technologies, including other 4G wireless access technologies, or fifth generation (5G) or later wireless access technologies that support voice communications in the PS domain.

A UE may be capable of using multiple different wireless access technologies, including, as examples, the LTE wireless access technology and a legacy wireless access technology such as WCDMA or GSM/EDGE (or any other wireless access technology that performs voice calls in the CS domain). In examples where the UE is able to use both the LTE wireless access technology and a legacy wireless access technology, the UE may respond to a request for a voice call by attempting to establish a VoLTE call. An example of a request to establish a voice call is a request to establish an emergency voice call, such as by dialing 911 or other similar numbers designated for emergency calls. When a user requests an emergency call, the user expects that the emergency call will be established relatively quickly.

However, where the UE uses multiple different wireless access technologies including the LTE wireless access technology and a legacy wireless access technology, there are two scenarios associated with the UE's attempt to establish the emergency voice call. In a first scenario (scenario 1), wireless coverage (with the UE's home network or a visited network, where a visited network is a network of an operator with which the home network operator of the user has an existing roaming agreement) is available and the UE can scan and detect multiple wireless access technologies including LTE. Since LTE wireless access is available and UE is able to use LTE, UE starts initial access (by performing attach) to the LTE bands. Once a voice call is initiated, UE initiates standard procedures to either establish a voice call over LTE (if VoLTE is configured and supported by the UE) or initiates a circuit-switched (CS) fallback (CSFB) procedure so that the network can redirect the UE to legacy wireless access networks and attempt the emergency call in the CS domain.

In a second scenario (scenario 2), if UE is out of wireless coverage (in other words, the UE is out of wireless coverage with the UE's home network or a visited network), the UE will first attempt establishing an emergency access to an LTE wireless access network (as the UE uses LTE). This initial attempt may or may not be successful. In both scenarios (1 and 2), there is a delay in call setup because UE is attempting LTE access while VoLTe is not supported. With scenario 2, the delay can be avoided or reduced using techniques or mechanisms according to some implementations of the present disclosure. In such scenario 2, the UE detects LTE coverage and attempts to attach to the LTE network in response to the request for an emergency voice call. In some cases, the network may accept the attach request from the UE, and may cause a CS fallback procedure to be performed to route the emergency voice call in the CS domain (e.g. in a WCDMA or GSM network) rather than in the PS domain of the LTE network. The emergency voice call can then be set up accordingly in the CS domain of the GSM network. Such a process that involves CS fallback can take from four to six seconds (for example) to complete the establishment of the emergency voice call.

In cases where the LTE network rejects the LTE attach attempt by the UE (such as by the LTE network sending a rejection with cause 15 to indicate "no suitable cells in the tracking area"), then the UE can attempt to initiate the emergency voice call in all other tracking area(s) in all LTE frequency bands (bands in other frequency ranges) used by the UE. Such a scan of other LTE bands can take a relatively long time, sometimes as long as or longer than 20 seconds, depending on the number of LTE bands to be scanned by the UE. After completing the scan of the other LTE bands and determining that no suitable cells in LTE bands are available, the UE then switches to the legacy wireless access technology to establish the emergency call in the CS domain. The setup time for the emergency voice call in this latter scenario (where the LTE network rejects the LTE attach attempt by the UE) can take up to or more than 20 seconds.

In either the CS fallback case or the case where the LTE attach attempt of by the UE is rejected, the time taken to establish the emergency voice call may be deemed excessively long and unacceptable considering the nature of the emergency calls.

Although the foregoing refers to issues associated with establishing an emergency voice call, it is noted that techniques or mechanisms according to some implementations can also be applied to other types of voice calls.

In accordance with some implementations of the present disclosure, a UE is able to more quickly establish a voice call (e.g. an emergency voice call or a non-emergency voice call) in a context where the UE is able to use multiple wireless access technologies, including a first wireless access technology that supports voice calls in the PS domain and a second wireless access technology that performs voice calls in the CS domain.

FIG. 1 is a flow diagram of an example process performed by a UE according to some implementations. The UE receives (at 102) a request to establish a voice call, such as an emergency voice call or a non-emergency voice call. The request is received in response to a user dialing a phone number, such as an emergency number or other number, on an input interface (e.g., keypad, touchscreen, etc.) of the UE. In response to the request, the UE determines (at 104) whether voice over a first wireless access technology (e.g., LTE wireless access technology) is supported. Responsive to determining that voice over the first wireless access technology is not supported, the UE attempts to establish (at 106) the voice call over a second wireless access technology (e.g., a WCDMA, GSM/EDGE, or other legacy wireless access technology that performs voice calls in the CS domain). Attempting to establish the voice call over a wireless access technology refers to initiating, by the UE, a procedure to attach to a wireless access network according to the wireless access technology. The attempt to establish the voice call may or may not be successful. Attempting to establish a voice call over a wireless access technology can also be referred to as "initiating establishment of a voice call over a wireless access technology."

In response to determining that voice over the first wireless access technology is supported, the UE attempts to establish (or initiates establishment of) (at 108) the voice call over the first wireless access technology, to perform the voice call in the PS domain.

With the process according to FIG. 1, the initial access (and procedures following initial access) of the first wireless access technology can be bypassed when the UE determines that voice over the first wireless access technology is not supported, to allow for potentially quicker establishment of the voice call over the second wireless access technology.

Figure 2:
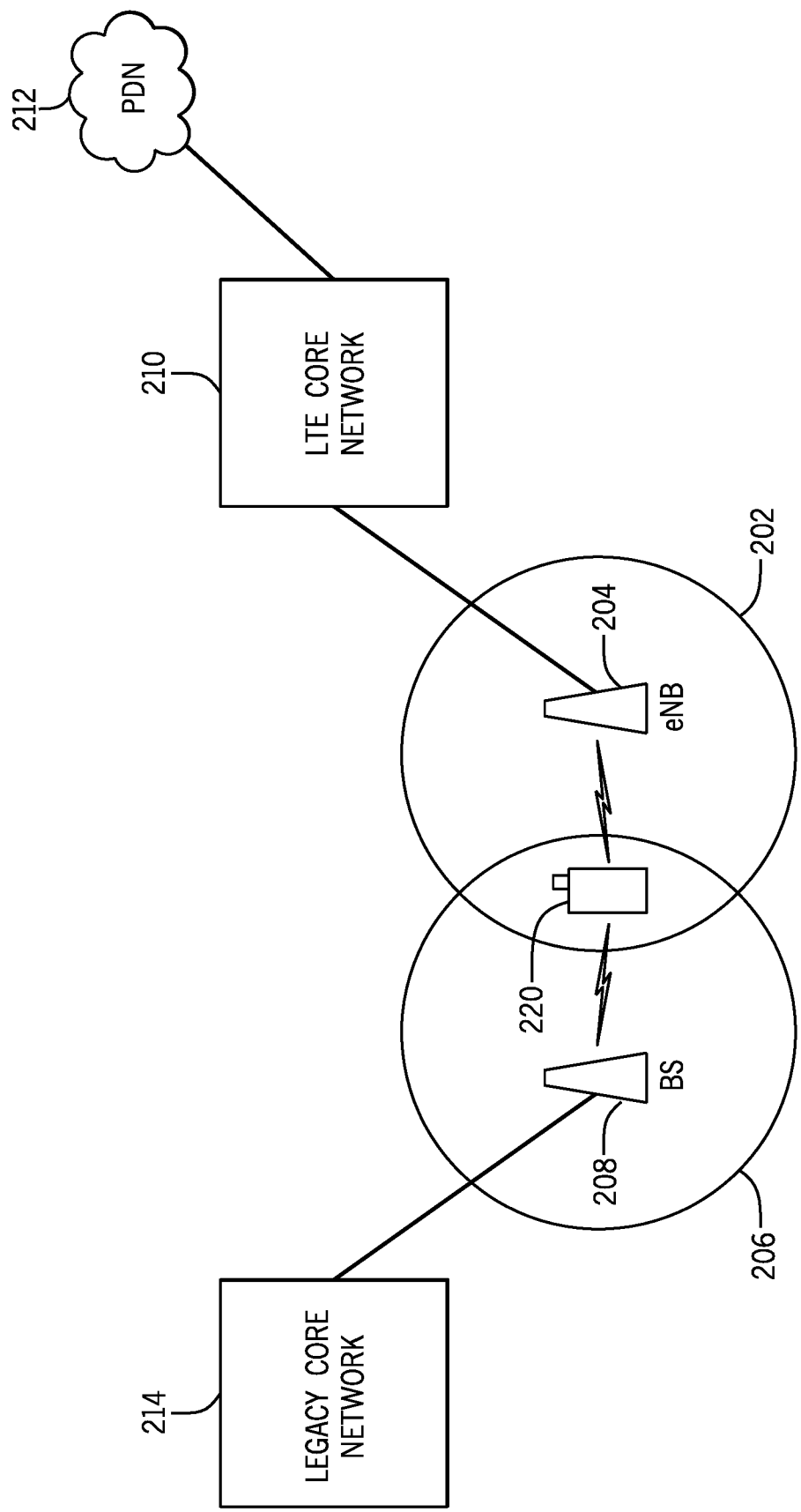
FIG. 2 is a block diagram of an example mobile communications network, according to some implementations.

FIG. 2 is a block diagram of an example mobile communications network that includes network nodes that operate according to a first wireless access technology (e.g. LTE wireless access technology) and network nodes that operate according to a second wireless access technology (e.g. legacy wireless access technology).

FIG. 2 shows a coverage area 202 of an LTE wireless access network node 204, and a coverage area 206 of a legacy base station 208. A wireless access network node or base station refers to a node that is able to wirelessly communicate over wireless links with UEs. Although just one LTE wireless access network node 204 and one legacy base station 208 are depicted in FIG. 2, it is noted that in other examples, there can be multiple LTE wireless access network nodes 204 that provide respective coverage areas 202, and multiple legacy base stations 208 that provide respective coverage areas 206.

In an LTE network, a wireless access network node can be implemented as an enhanced Node B (eNB). Although reference is made to eNBs in the ensuing discussion, it is noted that techniques or mechanisms according to the present disclosure can be applied with other types of wireless access network nodes that operate according to other protocols.

The eNB 204 is connected to an LTE core network 210, which includes various core network nodes. As examples, the core network nodes can include a serving gateway (SGW) and a packet data network gateway (PDN-GW). The PDN-GW is the entry and egress point for data communicated between a UE in the LTE network and a packet data network (PDN) 212, e.g. the Internet or another network. The SGW routes and forwards traffic data packets of a UE between the eNB 204 and PDN-GW. The SGW can also act as a mobility anchor for the user plane during handover procedures. The LTE core network nodes can also include a control node referred to as a mobility management entity (MME), which performs various control tasks associated with the LTE network. For example, the MME can perform idle mode mobile device tracking and paging, bearer activation and deactivation, selection of a serving gateway when a mobile device initially attaches to the E-UTRA network, handover of the UE between eNBs, authentication of a user, generation and allocation of a temporary identity to a mobile device, and so forth. In other examples, the MME 116 can perform other or alternative tasks.

The legacy base station 208 is connected to a legacy core network 214, which can include various legacy core network nodes. If the legacy core network 214 is a GSM core network, then examples of the core network nodes include a serving GPRS (General Packet Radio Service) support node (SGSN) that is responsible for delivery of data packets from and to the UEs, and a gateway GPRS support node (GGSN) that is responsible for internet working to an external packet data network, such as the PDN 212. The legacy core network 214 can also include a mobile switching center (MSC) to provide CS communications, such as CS voice calls.

Other core network nodes can be provided with other types of legacy core networks.

In the example of FIG. 2, a UE 220 is located within the coverage areas 202 and 206 of the eNB 204 and the legacy base station 208, respectively. Thus, if the UE 220 is able to use both the LTE wireless access technology and a legacy wireless access technology, the UE 220 is able to establish connections with either the eNB 204 or the base station 208. In accordance with some implementations, the UE 220 is able to perform tasks according to FIG. 1 to allow for quicker establishment of a voice call.

Figure 3:
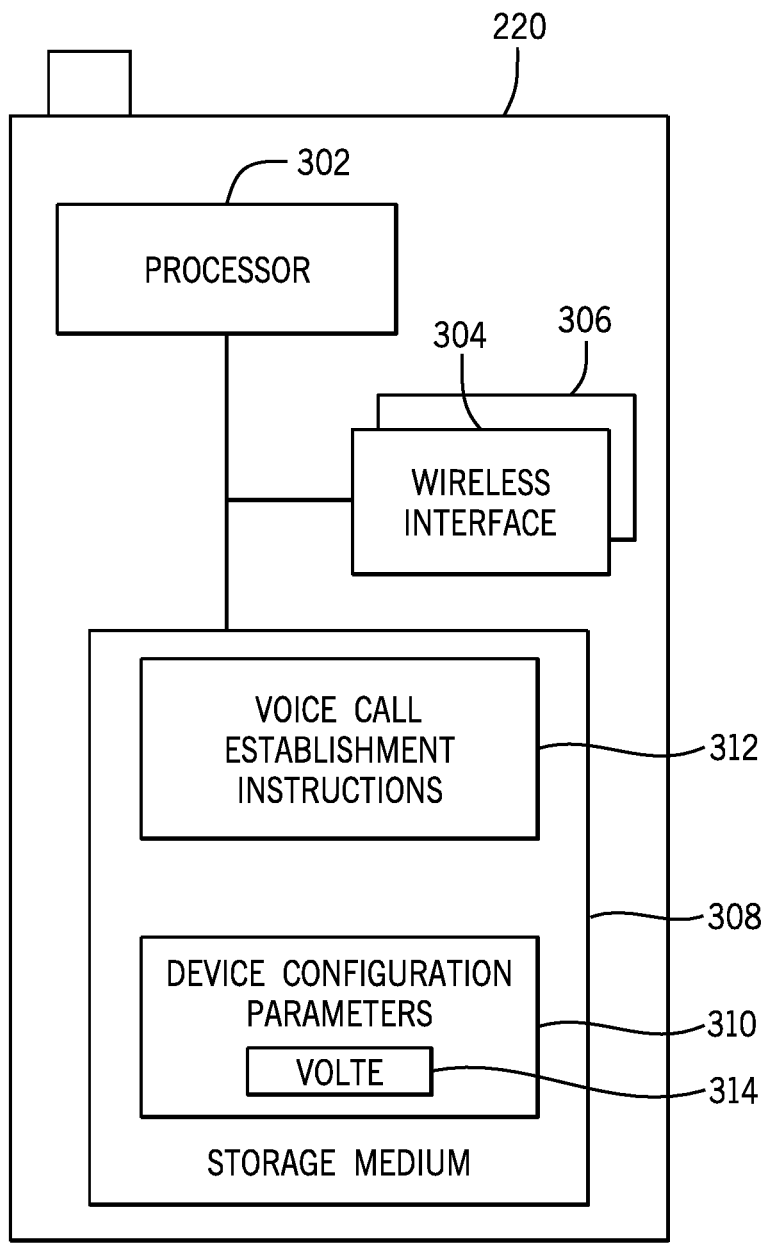
FIG. 3 is a block diagram of an example UE, according to some implementations.

FIG. 3 is a block diagram of an example UE 220, according to some implementations. The UE 220 includes a processor (or multiple processors) 302, and multiple wireless interfaces 304 and 306. A processor can include a microprocessor, a microcontroller, a hardware processor module or subsystem, a programmable integrated circuit, a programmable gate array, or processing hardware.

The wireless interface 304 can perform wireless communications with a mobile communications network according to a first wireless access technology (e.g. LTE wireless access technology), and the second wireless interface 306 is able to perform wireless communications according to a second wireless access technology (e.g., a legacy wireless access technology). Although two separate wireless interfaces 304 and 306 are shown in FIG. 3, it is noted that in other examples, a wireless interface is able to communicate using different wireless access technologies. Note that the UE may be able to attach to a wireless access technology one at a time, or alternatively, the UE may attach to multiple wireless access technologies concurrently.

The UE 220 also includes a storage medium (or storage media) 308, which can store a collection 310 of device configuration parameters and voice call establishment instructions 312. Although FIG. 3 shows the collection 310 of device configuration parameters and the voice call establishment instructions 312 being part of the same storage medium 308, it is noted that in other implementations the collection 310 of device configuration parameters and the voice call establishment instructions 312 can be stored in separate storage media.

The collection 310 of device configuration parameters can include various parameters that relate to a configuration of the UE 220. One of the device configuration parameters of the collection 310 can be a VoLTE parameter 314 to indicate whether or not VoLTE is supported. More generally, the parameter 314 can indicate whether or not a voice call in a PS domain is supported. If the VoLTE parameter 314 is set to a first value, then that indicates that VoLTE is supported; however, if the VoLTE parameter 314 is set to a second value, then that indicates that VoLTE is not supported.

Examples of other device configuration parameters in the collection 310 can include a parameter to indicate that the UE 220 is LTE capable, a parameter (or parameters) to identify the LTE bands supported, a parameter indicating whether or not LTE is preferred, and so forth.

The collection 310 of device configuration parameters may be statically configured in the UE 220 (such that the device configuration parameters cannot be changed during operation of the UE 220). In other examples, the collection 310 of device configuration parameters can be dynamically set by a mobile communications network during operation of the UE 220 in the mobile communications network. For example, the mobile communications network can send a message to the UE 220 to set one or more of the device configuration parameters, including the VoLTE parameter 314.

The collection 310 of device configuration parameters can be stored in a Subscriber Identity Module (SIM) card of the UE 220, or can be stored in another storage medium of the UE 220.

The voice call establishment instructions 312 include machine-readable instructions that are executable by the processor(s) 302. The voice call establishment instructions 312 when executed by the processor(s) 302 can perform tasks according to some implementations of the present disclosure, including the tasks of FIG. 1, for example. More generally, the voice call establishment instructions 312 are able to first determine whether or not voice over a first wireless access technology (e.g., VoLTE) is supported, and based on this determination, can perform establishment of a requested voice call over either the first wireless access technology (e.g. LTE wireless access technology) or a second wireless access technology that supports just voice calls in a CS domain.

The voice call establishment instruction 312 can determine whether or not voice over the first wireless access technology is supported based on accessing the VoLTE parameter 314.

By employing techniques or mechanisms according to some implementations, quicker voice establishment can be accomplished in a UE that uses multiple different types of wireless access technologies.

The storage medium (or storage media) 308 can include non-transitory computer-readable or machine-readable storage medium (or storage media), which can include one or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
receiving, by a user equipment (UE) that is able to use a plurality of different wireless access technologies, a request to establish an outgoing voice call, wherein the request to establish the outgoing voice call is responsive to a user dialing a number;
storing a device configuration parameter in a storage medium of the UE, the device configuration parameter configured by a mobile communications network;
setting a value of the device configuration parameter stored in the storage medium to one of a first value and a second value as configured by the mobile communications network, wherein the device configuration parameter when set to the first value indicates that voice over a packet-switched domain is supported by a first wireless access technology, and the device configuration parameter when set to the second value indicates that voice over the packet-switched domain is not supported by the first wireless access technology;
accessing, by the UE, the device configuration parameter stored in the storage medium of the UE;
determining, by the UE based on the device configuration parameter stored in the storage medium of the UE, whether voice over the packet-switched domain is supported by the first wireless access technology; and
responsive to determining that voice over the packet-switched domain is not supported by the first wireless access technology, attempting to establish, by the UE, the outgoing voice call over a second wireless access technology of the different wireless access technologies,
wherein the determining and the attempting to establish are performed in response to the UE being out of wireless coverage of a home network of the UE.

2. The method of claim 1, wherein the second wireless access technology performs a voice call in a circuit-switched domain.

3. The method of claim 1, wherein the first wireless access technology is a Long-Term Evolution (LTE) wireless access technology.

4. The method of claim 1, wherein receiving the request to establish the outgoing voice call comprises receiving a request to establish an outgoing emergency voice call.

5. The method of claim 1, further comprising:
responsive to determining that voice over the packet-switched domain is supported by the first wireless access technology, attempting to establish, by the UE, the outgoing voice call over the first wireless access technology.

6. The method of claim 1, wherein the device configuration parameter is stored in a Subscriber Identity Module (SIM) of the UE.

7. A user equipment (UE) comprising:
a storage medium to store a device configuration parameter that is configurable by a mobile communications network;
at least one wireless interface to communicate with the mobile communications network according to one or more of a plurality of different wireless access technologies; and
at least one processor configured to:
receive a request to establish an outgoing voice call, wherein the request to establish the outgoing voice call is responsive to a user dialing a number,
set a value of the device configuration parameter stored in the storage medium to one of a first value and a second value as configured by the mobile communications network, wherein the device configuration parameter when set to the first value indicates that voice over a packet-switched domain is supported by a first wireless access technology, and the device configuration parameter when set to the second value indicates that voice over the packet-switched domain is not supported by the first wireless access technology,
access the device configuration parameter stored in the storage medium of the UE,
determine, based on the device configuration parameter stored in the storage medium of the UE, whether voice over the packet-switched domain is supported by the first wireless access technology, and
responsive to determining that voice over the packet-switched domain is not supported by the first wireless access technology, attempt to establish the outgoing voice call over a second wireless access technology of the different wireless access technologies,
wherein the at least one processor is configured to perform the determining and the attempting to establish in response to the UE being out of wireless coverage of a home network of the UE.

8. The UE of claim 7, wherein the determining of whether voice over the packet-switched domain is supported by the first wireless access technology comprises determining whether voice over Long-Term Evolution (LTE) is supported.

9. The UE of claim 7, wherein the attempting of the establishing of the outgoing voice call over the second wireless access technology comprises attempting the establishing of the outgoing voice call in a circuit-switched domain.

10. The UE of claim 7, wherein the at least one processor is configured to further:
responsive to determining that voice over the packet-switched domain is supported by the first wireless access technology, attempt to establish the outgoing voice call over the first wireless access technology.

11. The UE of claim 10, wherein the outgoing voice call over the first wireless access technology comprises a voice call in the packet-switched domain.

12. The UE of claim 7, wherein the request to establish the outgoing voice call comprises a request to establish an outgoing emergency voice call.

13. An article comprising at least one non-transitory machine-readable storage medium storing instructions that upon execution cause a user equipment (UE) to:
receive a request to establish an outgoing voice call at the UE that is able to use a plurality of different wireless access technologies, wherein the request to establish the outgoing voice call is responsive to a user dialing a number;
store a device configuration parameter in a storage medium of the UE, the device configuration parameter configured by a mobile communications network;
set a value of the device configuration parameter stored in the storage medium to one of a first value and a second value as configured by the mobile communications network, wherein the device configuration parameter when set to the first value indicates that voice over a packet-switched domain is supported by a first wireless access technology, and the device configuration parameter when set to the second value indicates that voice over the packet-switched domain is not supported by the first wireless access technology;

access the device configuration parameter stored in the storage medium of the UE;

determine, based on the device configuration parameter stored in the storage medium of the UE, whether voice over the packet-switched domain is supported by the first wireless access technology; and responsive to determining that voice over the packet-switched domain is not supported by the first wireless access technology, attempt to establish the outgoing voice call over a second wireless access technology of the different wireless access technologies, wherein the instructions are to perform the determining and the attempting to establish in response to the UE being out of wireless coverage of a home network of the UE.

14. The article of claim 13, wherein the request to establish the outgoing voice call is a request to establish an outgoing emergency voice call responsive to a user dialing an emergency number.

15. The article of claim 13, wherein the outgoing voice call over the second wireless access technology is in a circuit-switched domain.

16. The article of claim 13, wherein the instructions upon execution cause the UE to:

responsive to determining that voice over the packet-switched domain is supported by the first wireless access technology, attempt to establish the outgoing voice call over the first wireless access technology.

17. The article of claim 16, wherein the outgoing voice call over the first wireless access technology is in the packet-switched domain.

* * * * *